(12) United States Patent
Makarov (10) Patent No.: US 10,649,888 B2
(45) Date of Patent: May 12, 2020

(54) PARALLELIZABLE DATA-DRIVEN TESTING

(71) Applicant: Dell Products L. P., Round Rock, TX (US)

(72) Inventor: Mykhailo Makarov, Ballybrack (IE)

(73) Assignee: Dell Products L.P., Round Rock, TX (US)

( * ) Notice: Subject to any disclaimer, the term of this patent is extended or adjusted under 35 U.S.C. 154(b) by 268 days.

(21) Appl. No.: 15/884,568

(22) Filed: Jan. 31, 2018

(65) Prior Publication Data

US 2019/0235996 A1 Aug. 1, 2019

(51) Int. Cl.
*G06F 11/36* (2006.01)

(52) U.S. Cl.
CPC ...... *G06F 11/3684* (2013.01); *G06F 11/3688* (2013.01)

(58) Field of Classification Search
CPC .................. G06F 11/3684; G06F 11/3688
See application file for complete search history.

(56) References Cited

U.S. PATENT DOCUMENTS

| | | | | |
|---|---|---|---|---|
| 6,385,740 B1* | 5/2002 | Treadway | ............... | G06F 11/26 714/33 |
| 6,430,705 B1* | 8/2002 | Wisor | ................. | G06F 11/3684 714/30 |
| 2009/0327937 A1* | 12/2009 | Lachner | .............. | G06F 11/3664 715/764 |

\* cited by examiner

*Primary Examiner* — Wei Y Zhen
*Assistant Examiner* — Amir Soltanzadeh
(74) *Attorney, Agent, or Firm* — Campbell Stephenson LLP; Shiv S. Naimpally (57) ABSTRACT

Disclosed herein are methods, systems, and processes to generate and perform parallelizable data-driven single instruction multiple data (SIMD) tests. A base abstract class that defines shared testing parameters for tests to be performed on an application is designated. Inheriting classes of the base abstract class are defined and a data source key is derived from the inhering classes. A test data source is accessed to perform the tests on the application and a result of tests is generated based on the data source key.

20 Claims, 6 Drawing Sheets

PARALLELIZABLE DATA-DRIVEN TESTING

BACKGROUND OF THE DISCLOSURE

This disclosure is related to computing systems for software testing. In particular, this disclosure is related to parallelizing data-driven testing and generating parallelizable single instruction multiple data (SIMD) tests.

DESCRIPTION OF THE RELATED ART

Single instruction multiple data (SIMD) is a class of parallel computers with multiple processing elements that perform the same operation on multiple data points simultaneously. Therefore, SIMD instructions exploit data level parallelism by facilitating simultaneous parallel computations with a single process (instruction) at a given moment. Modern technology businesses and enterprises implement SIMD-based testing to test various applications, computer programs, software features, and the like.

Parallelization refers to the process of taking serial code that runs on a single central processing unit (CPU) and spreading the work across multiple CPUs. Parallelization can be accomplished using shared memory techniques to utilize the cores within a single compute node or distributed memory methods that allow applications to run across multiple nodes each with their own local memory. Therefore, parallelization involves converting sequential code into multi-threaded code and/or vectorized code in order to utilize multiple processors simultaneously (e.g., in a shared-memory multiprocessor (SMP) computing system).

Software testing encompasses various computer-based testing methodologies where individual units of code, multiple units of data, and/or underlying units of code (e.g., code and/or data associated with an application or computer program) are evaluated and tested to determine whether they are fit for use (e.g., for a given business purpose). Unfortunately, existing software testing methodologies in modern enterprise computing environments only provide for data-driven testing or parallelization.

SUMMARY OF THE DISCLOSURE

Disclosed herein are methods, systems, and processes to parallelize data-driven testing and generate parallelizable single instruction multiple data (SIMD) tests. One such method involves designating a base abstract class that defines shared testing parameters for tests to be performed on an application, defining inheriting classes of the base abstract class, deriving a data source key from the inhering classes, accessing a test data source to perform the tests on the application, and generating a result of tests based on the data source key. In this example, the tests are single instruction multiple data (SIMD) tests.

In one embodiment, the method involves creating the SIMD tests by combining an inheritance mechanism for code duplication operations, a unit test methodology, an integration testing methodology, a user interface (UI) testing methodology, or an end-to-end testing methodology for long run time operations for long run time operations, and the test data source for test data duplication operations.

In some embodiments, the method involves executing each inheriting class in parallel. In this example, the test data source includes a credentials data source and a validation data source, and the data source key is a country code.

In other embodiments, the method involves determining that a new test has been added to the tests, applying the new test to each inheriting class, and adding a new inheriting class to the inheriting classes, permitting the new inheriting class to inherit the tests in the base abstract class. In these examples, the method performs the tests that include the new test or the new inheriting class on the application.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Single Instruction/Multiple Data (SIMD) operations refer to a computing method that enables processing of multiple data points with a single instruction. A single computer instruction performs the same identical action (e.g., retrieve, calculate, store, and the like) on two or more pieces of data. SIMD operations typically require multiple processors, each with a local memory that stores data. Each processor simultaneously performs the same instruction on local data progressing through instructions in lock-step with instructions issued by a controller processor. The processors also communicate with each other in order to perform shifts and other array operations. Therefore, because SIMD operations facilitate combining multiple operations into a single computer instruction, SIMD operations can be used to perform large-scale software and/or application testing in modern enterprise computing environments.

Parallelization involves converting sequential code into multi-threaded code and/or vectorized code in order to utilize multiple processors simultaneously in a shared-memory multiprocessor (SMP) computer system. Therefore, given their advantages, SIMD operations, in conjunction with various parallelization techniques (e.g., bit-level parallelization, instruction-level, data parallelization, and task parallelization, among others), provide a useful mechanism to facilitate and expedite large-scale parallelizable software testing in modern enterprise computing environments.

Unit testing is a software development and testing process (e.g., test-driven development, behavior-driven development, and other such data-driven development processes) in which the smallest testable parts of an application or computer program (called units) are individually and independently evaluated for proper and correct operation. Unit testing typically involves program characteristics that are vital to the performance of the unit under testing. Therefore, developers can modify source code without immediate concerns about how such changes might affect the function of other units of the program as a whole. Because unit testing provides for the introduction and use of control data, usage procedures, operating procedures, and other such data-driven testing parameters, unit testing is useful to perform data-driven software testing in SIMD-based parallelized computing environments.

In addition to unit testing (which tests separated units of code that are isolated from other such units), the present disclosure contemplates but is not limited to various other software testing methodologies including, integration testing (where testing is performed on several units of data in integration with each other), user interface (UI) testing (where a UI is tested in integration with underlying units of code), and system integration testing (or end-to-end) testing (where several systems are integrated together and the testing follows a workflow a user goes through when working with a given application). It should be noted that unit tests do not authenticate, whereas integration testing may or may not require authentication (thus requiring credentials for authentication). Therefore, in addition to unit testing, integration testing, UI testing, and/or system integration testing methodologies are useful to perform data-driven software testing in SIMD-based parallelized computing environments.

In modern enterprise computing environments where SIMD-based tests are implemented, the same automated tests have to be executed for a number of similar parameters. For example, testing a given application for Europe, the Middle East, and Africa (EMEA) requires a given test to be executed for dozens of countries (e.g., depending on (different) data-driven requirements of each country). If new requirements have to be tested, a new test has to be created for each country. Similarly, if a new country is added, the various tests have to be rewritten. Compounding the difficulty of test generation and modification in such scenarios is that fact that only the execution of such tests by classes can be parallelized, and including such tests in one class prohibits time efficient execution. Therefore, executing the same test code against multiple parameters and/or inputs in software development and testing environments presents a unique technology-related challenge.

Unfortunately, existing software testing methodologies in modern enterprise computing environments only take advantage of the benefits of data-driven SIMD testing or parallelization-based SIMD testing, but not both. Disclosed herein are methods, systems, and processes to parallelize data-driven SIMD tests.

Example Parallelizable Data-Driven Testing Computing System

Figure 1:
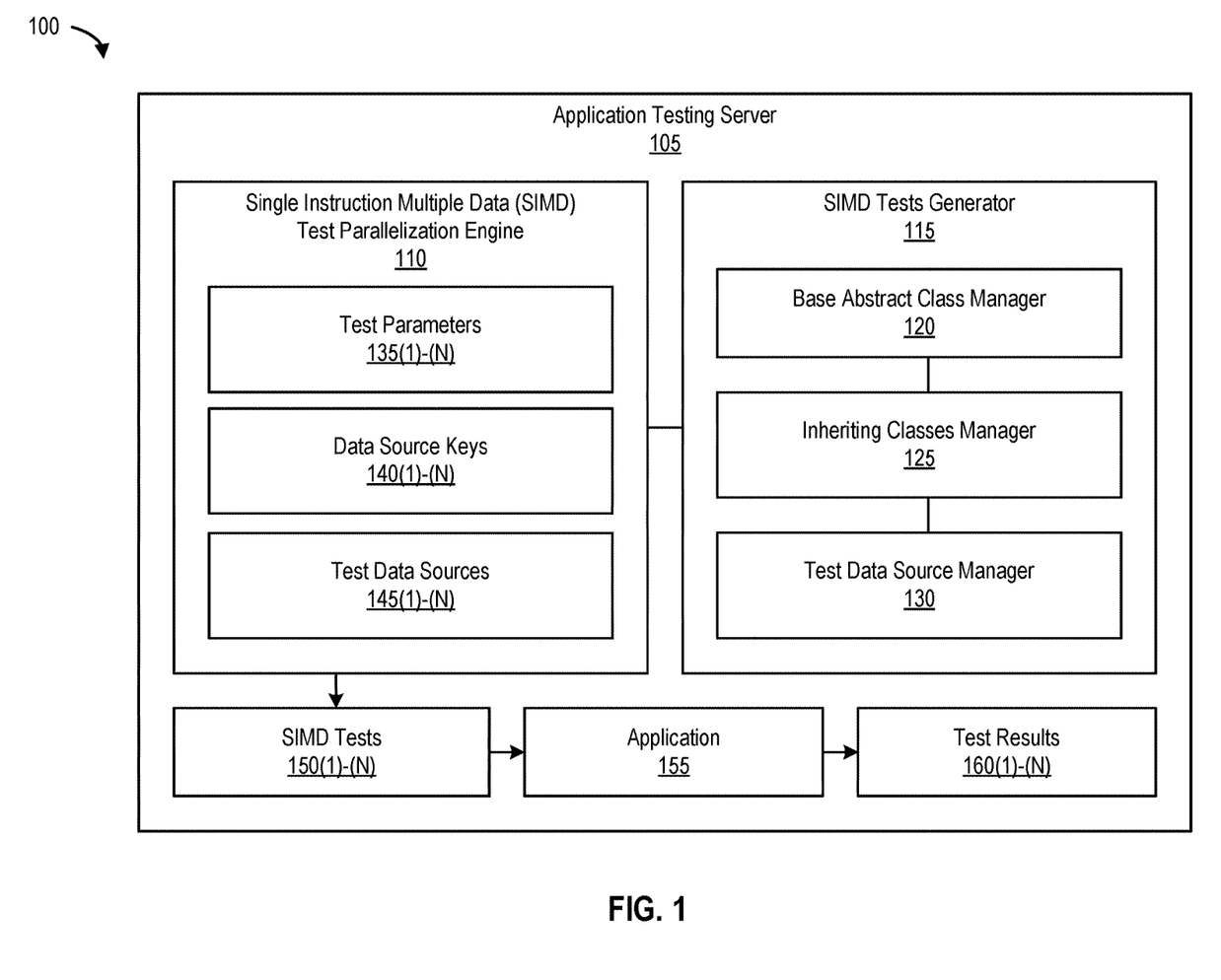
FIG. 1 is a block diagram 100 of a parallelizable data-driven testing computing system, according to one embodiment of the present disclosure.

FIG. 1 is a block diagram 100 of a parallelizable data-driven testing computing system, according to one embodiment. As shown in FIG. 1, application testing server 105 implements a single instruction multiple data (SIMD) test parallelization engine 110 and a SIMD tests generator 115. SIMD test parallelization engine 110 invokes SIMD tests generator 115. SIMD tests generator includes at least a base abstract class manager 120, an inheriting classes manager 125, and a test data source manager 130. SIMD test parallelization engine 110 includes test parameters 135(1)-(N), data source keys 140(1)-(N), and test data sources 145(1)-(N). In conjunction with SIMD test parallelization engine 110, application test server 105 creates SIMD tests 150(1)-(N) for application 150, and also generates test results 160(1)-(N) based on SIMD tests 150(1)-(N). Therefore, application testing server 105 is configured with SIMD test parallelization engine 101 to parallelize data-drive SIMD tests.

SIMD test parallelization engine 110 permits application testing server 105 to execute (or run) tests (e.g., nUnit, MSTest, and the like). SIMD tests generator 115 generates the tests (e.g., SIMD tests 150(1)-(N)) as executable objects (e.g., in memory or on disk) and follows the principle of inheritance. In one embodiment, SIMD tests generator 115 is a compiler. However, in certain embodiments, regardless of whether SIMD tests generator 115 is a static compiler (e.g., a set of open source compilers and code analysis application programming interfaces (APIs) such as Roslyn, and the like) or a just-in-time compiler (e.g., .Net runtime executor such as RyuJIT, and the like), SIMD tests generator 115 is separate from and is invoked by SIMD test parallelization engine 110.

As noted, SIMD test parallelization engine 110 has access to and invokes SIMD tests generator 115 which includes base abstract class manager 120, inheriting classes manager 125, and test data source manager 130. In one embodiment, base abstract class engine 120 defines one or more test bodies (e.g., test objects), inheriting classes manager 125 facilitates inferring or deduction of a data source key, and test data source manager 130 produces data (e.g., test results) based on the data source key.

In object-oriented programming, a class is an extensible program-code-template for creating objects, providing initial values for state (e.g., member variables), and implementing behavior (e.g., member functions or methods). A class name is used as the name for the class (e.g., the template), the name for the default constructor of the class (e.g., a subroutine that creates objects), and as the type of objects generated by instantiating the class. When an object is created by a constructor of the class, the resulting object is called an instance of the class, and the member variables specific to the object are called instance variables (e.g., as opposed to class variables that are shared across the class).

Base abstract class manager 120 designates a given class as a base abstract class that cannot be instantiated. The base abstract class provides implementations of one or more method (e.g., testing methods), and also specifies virtual methods (e.g., via signatures) that are to be implemented by direct or indirect descendants of the base abstract class (e.g., one or more inheriting classes). Before an inheriting class derived from the base abstract class can be instantiated, the abstract methods of the base abstract class is implemented by an inheriting class in the derivation chain.

Inheriting classes manager 125 designates one or more classes as inheriting classes of the base abstract class. In this manner, the inheriting classes acquire the properties and behavior of the base abstract class. In one embodiment, the inheriting classes designated or created by inheriting classes manager 125 differ in names. A data source key (e.g., a country code) can be inferred by SIMD tests generator 115 from the inheriting classes. In this example, test data source manager 130 provides access to a test data source (e.g., both credentials details and assert data) and produces data based on the data source key.

In certain embodiments, SIMD tests generator 115 combines base abstract class manager 120, inheriting classes manager 125, and test data source manager 130 to generate an SIMD-oriented test (e.g., one of SIMD tests 150(1)-(N)). For example, SIMD tests parallelization engine 110 implemented by application test server 105 combines the inheritance principle from object-oriented programming described above (e.g., to address code duplication), unit testing run parallelization (e.g., to address long run time), and a data-driven testing approach (e.g., to address test data duplication) to create, generate, modify, and/or compose one or more SIMD-oriented tests (e.g., SIMD tests 150(1)-(N)).

In some embodiments, SIMD tests parallelization engine 110 combines a base abstract class generated or designated by base abstract class manager 120 that defines test bodies (e.g., test parameters 135(1)-(N)), inheriting classes generated or designated by inheriting classes manager 125 that differ in names from which a data source key (e.g., data source key 140(1) such as a country code) can be inferred, and a test data source (e.g., test data source 145(1)) which generates data based on the data source key.

In other embodiments, each inhering class designated by inheriting classes manager 125 is executed in parallel by SIMD test parallelization engine 110 (the only upper limit or limitation being the hardware capacity of application testing server 105). In this example, when a new test is added, the new test is applied to each designated inheriting class by inheriting classes manager 125, and when a new inheriting class is added, the new inheriting class inherits the test in the base abstract class designated by base abstract class manager 120.

In this manner, and in certain embodiments, SIMD tests parallelization engine 110 permits test data updates to be isolated from test code updates (e.g., by bifurcating code duplication and runtime, and test data duplication, while at the same time combining the foregoing constructs in a single parallelizable SIMD test composition architecture), and also allows the identification of inheriting classes by a category, thus permitting the execution of one or more SIMD tests only when needed. In doing so, SIMD tests parallelization engine 110 does not prevent or inhibit further enhancements to SIMD tests (e.g., authentication simulation, backend responses virtualization, and the like).

Therefore, SIMD test parallelization engine 110 combines data-driven testing and parallelization to permit parallelized data-driven software development and testing enabling SIMD tests generator 115 to save time compared to existing approaches of writing tests (e.g., duplicating code or slightly altering the code from class to class) and executing the tests (e.g., executing the same tests with multiple test runs providing only related parameters).

Example of Generating Parallelizable SIMD Tests

Figure 2:
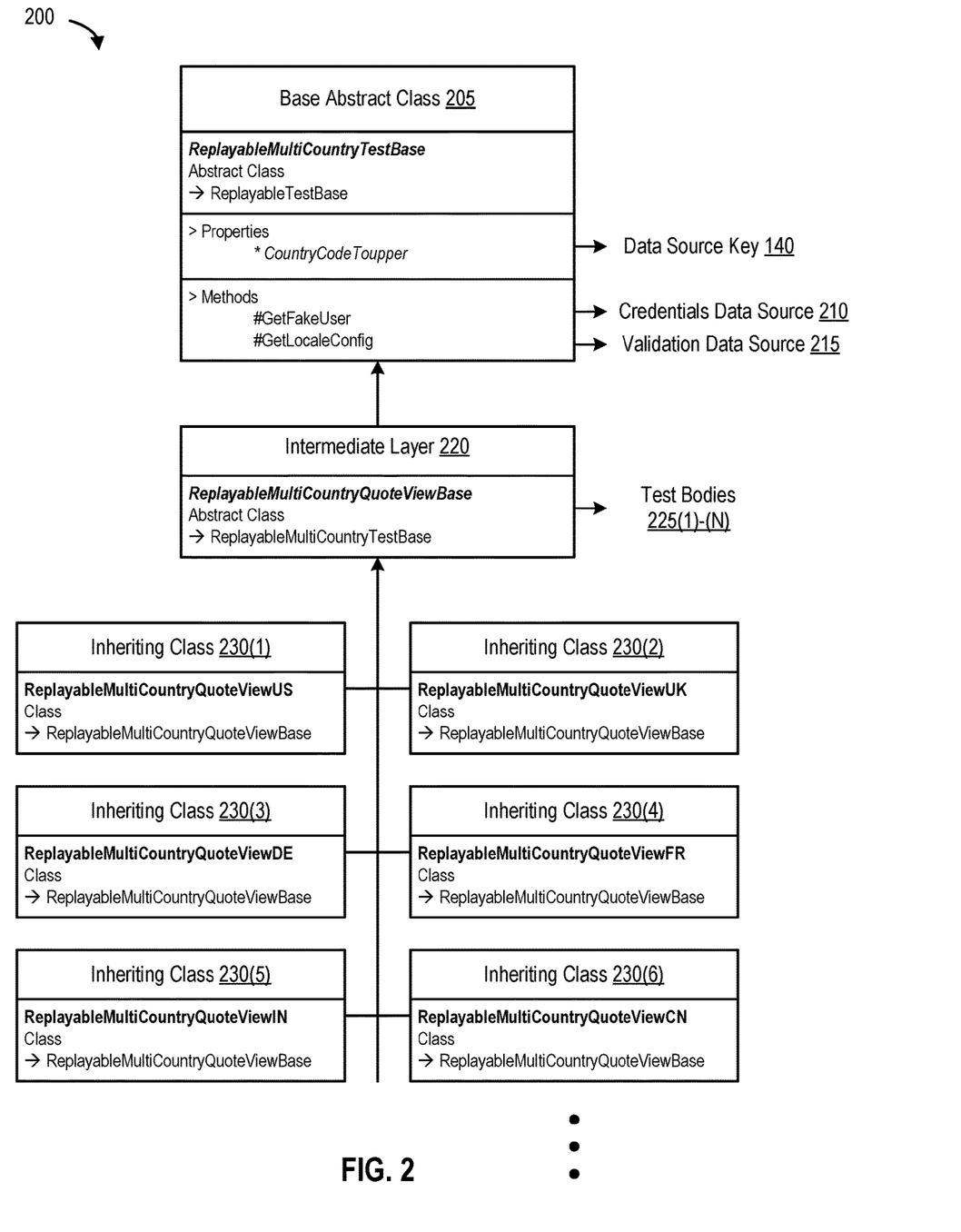
FIG. 2 is a block diagram 200 of a parallelizable single instruction multiple data (SIMD) test composition architecture, according to one embodiment of the present disclosure.

FIG. 2 is a block diagram 200 of a parallelizable single instruction multiple data (SIMD) test composition architecture, according to one embodiment. As shown in FIG. 2, a base abstract class 205 includes at least a data source key 140, a credentials data source 210, and a validation data source 215. Test bodies 225(1)-(N) (e.g., testing parameters, testing data points, testing procedures, and the like) are implemented in intermediate layer 220. Inheriting classes 230(1)-(6) are derived from base abstract class 205 via intermediate layer 220, which provides data-driven testing parameters or test bodies in the parallelizable computing environment of FIG. 2. In this example, data source key 140 is inferred from the country code in the name of the inheriting class. In this manner, the software testing architecture shown in FIG. 2 combines data-driven testing and parallelization to permit parallelizable data-driven SIMD test composition in enterprise software development and testing environments.

In one embodiment, base abstract class manager 120 designates base abstract class 205 that defines one or more shared testing parameters (e.g., test bodies such as testing parameters 225(1)-(N)) for one or more tests (e.g., SIMD tests 150(1)-(N)) to be performed on application 155. In this example, inheriting classes manager 125 defines inheriting classes 230(1)-(6) of base abstract class 205 and derives (or infers) data source key 140 from inheriting classes 230(1)-(6). Test data source manager 130 then accesses a test data source to perform SIMD tests on application 155. SIMD test parallelization engine 110 then generates a result of the SIMD tests based on data source key 140 (e.g., test results 160(1)-(N)). In this manner, SIMD tests generator 115 generates (or composes) one or more SIMD tests (e.g., SIMD tests 150(1)-(N) that are parallelizable as well as data-driven, and can be executed expediently in a time efficient manner (e.g., for software development and testing purposes).

In certain embodiments, SIMD tests generator 115 generates SIMD tests 150(1)-(N) by combining an inheritance mechanism for code duplication operations, a unit testing methodology, an integration testing methodology, a UI testing methodology, and/or a system integration (or end-to-end) testing methodology for long run time, and a test data source (that includes credentials data source 210 and validation data source 215) for test data duplication operations. By combining the foregoing, SIMD tests generator 115 provides a bifurcated approach to SIMD-oriented testing by isolating test data updates from test code updates.

In some embodiments, SIMD test parallelization engine 110 executes each inheriting class in parallel (e.g., inheriting classes 230(1)-(6) as shown in FIG. 2). In other embodiments, SIMD tests generator 115 determines whether a new SIMD test has been added to SIMD tests 150(1)-(N) or whether a new inheriting class has been added to inheriting classes 230(1)-(6). If a new SIMD test has been added to SIMD tests 150(1)-(N) (e.g., SIMD test 150(N+1)), SIMD tests generator 115 applies SIMD test 150(N+1) to each inheriting class (e.g., to inheriting classes 230(1)-(6), and if a new inheriting class has been added, permits the new inheriting class (e.g., inheriting class 230(7) to inherit (or acquire) the tests (e.g., SIMD tests 150(1)-(N+1)) in base abstract class 205.

Therefore, the methods and systems of FIGS. 1 and 2 permit software testing computing environments to take advantage of the benefits of both data-driven SIMD testing and parallelization-based SIMD testing by parallelizing data-driven SIMD tests.

Example Processes to Parallelize Data-Driven SIMD Tests

Figure 3:
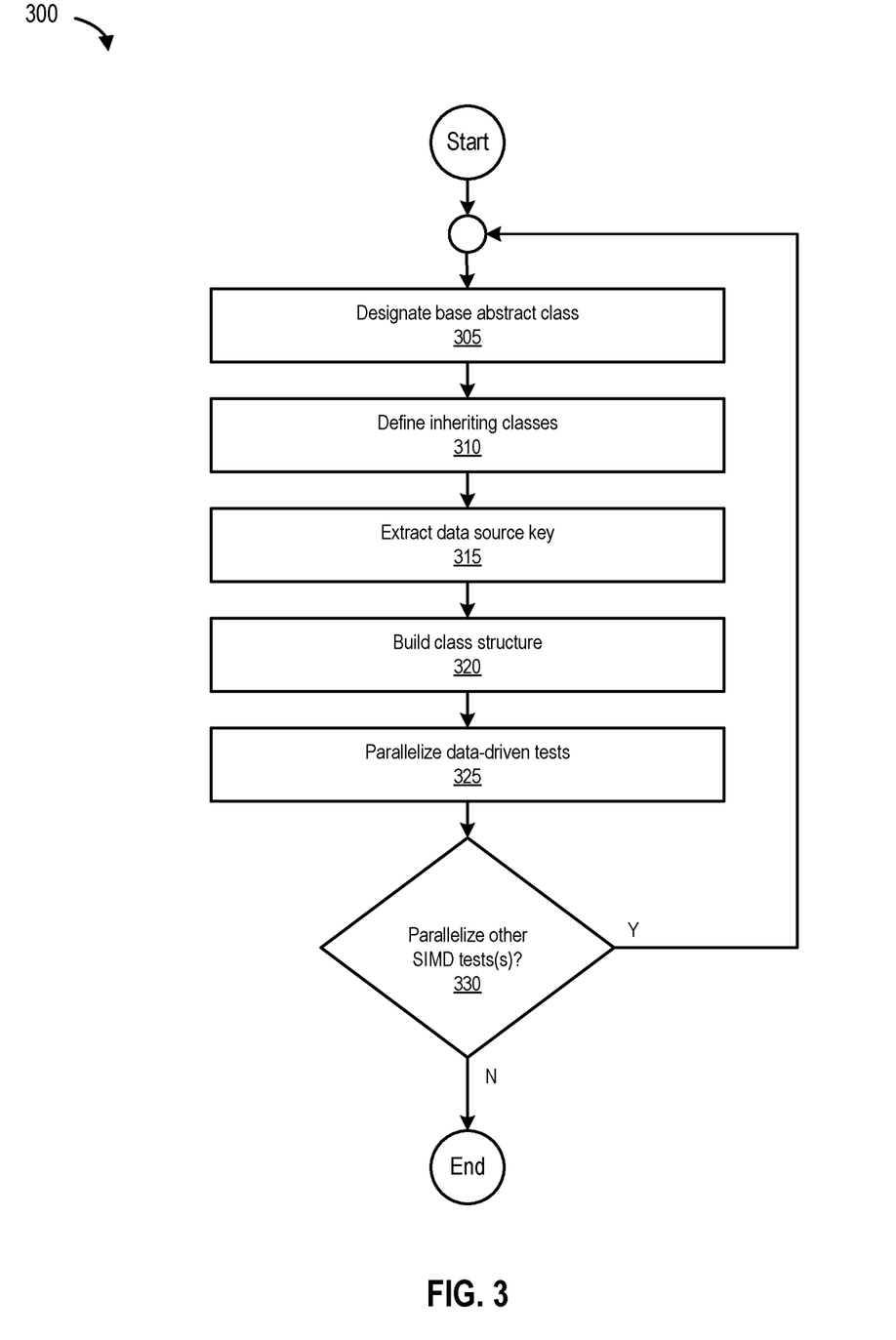
FIG. 3 is a flowchart 300 of a process to parallelize data-drive tests, according to one embodiment of the present disclosure.

FIG. 3 is a flowchart 300 of a process to parallelize data-drive tests, according to one embodiment. The process begins at 305 by designating a base abstract class (e.g., base abstract class 205 designated by base abstract class manager 120). At 310, the process defines inheriting classes (e.g., inheriting classes 230(1)-(6) defined by inheriting classes manager 125). At 315, the process extracts (e.g., infers or derives from name of a given inheriting class) a data source key (e.g., data source key 140). For example, and as shown in FIG. 2, a data source key can be inferred from a country code in the name of an inheriting class.

At 320, the process builds a class structure (e.g., with intermediate layer 220 to implement one or more test bodies as shown in FIG. 2), and at 325 parallelizes data-driven tests (e.g., SIMD tests 150(1)-(N)). At 330, the process determines if other SIMD tests require parallelization (e.g., whether there is a new testing requirement (e.g., a new test) or whether a new country (e.g., a new class) has been added). If other SIMD tests need to be parallelized, the process loops to 305. Otherwise, the process ends.

Figure 4:
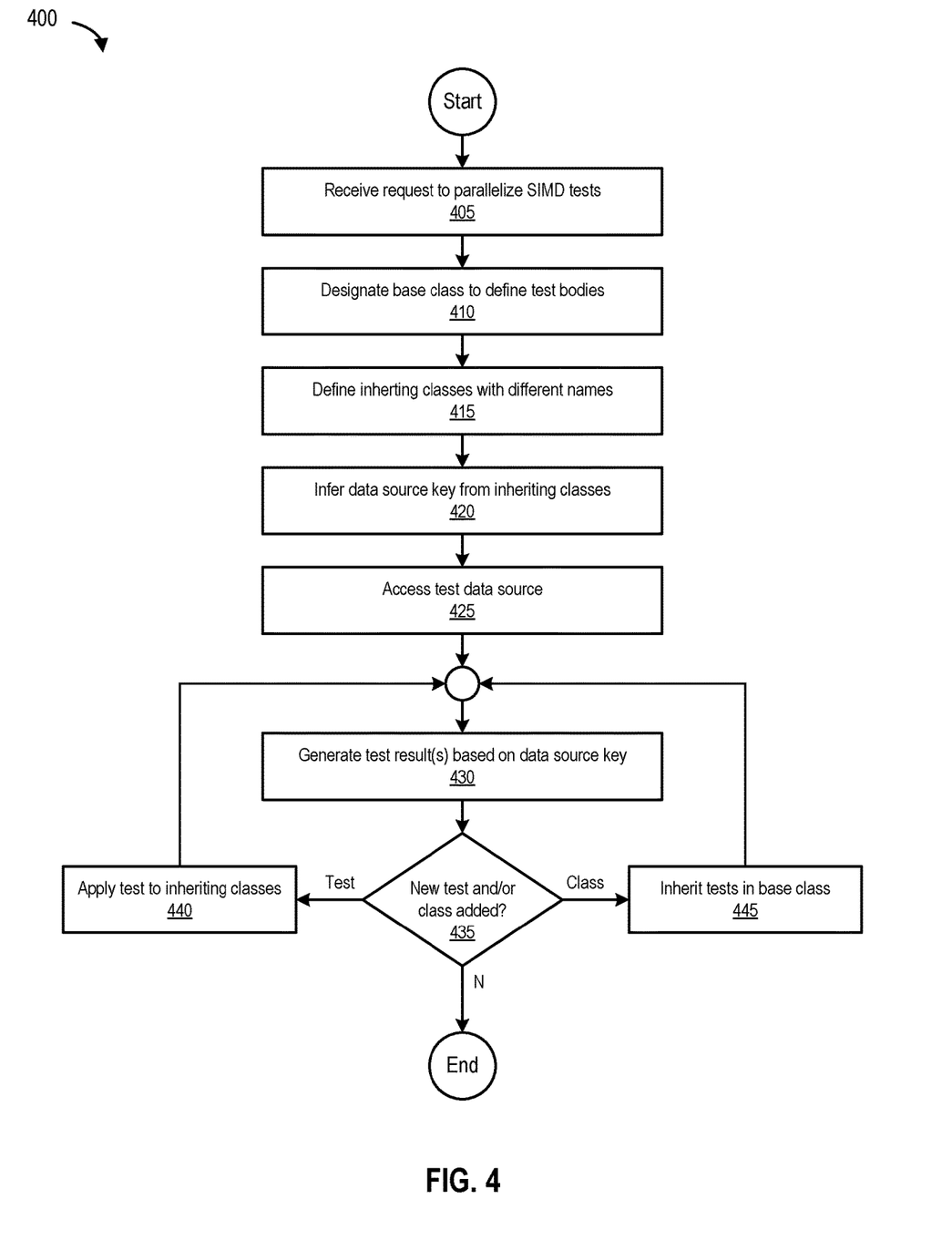
FIG. 4 is a flowchart 400 of a process for generating parallelizable SIMD tests, according to one embodiment of the present disclosure.

FIG. 4 is a flowchart 400 of a process for generating parallelizable SIMD tests, according to one embodiment. The process begins at 405 by receiving a request to parallelize SIMD tests (e.g., at SIMD test parallelization engine 110). At 410, the process designates a base class (e.g., base abstract class 205) to define test bodies (e.g., test bodies 225(1)-(N) implemented in intermediate layer 220). At 415, the process defines inheriting classes (e.g., inheriting classes 230(1)-(6)) with different names (e.g., with different country code names as shown in FIG. 2).

At 420, the process infers a data source key (e.g., data source key 140) from the inheriting classes, and at 425, accesses the test data source. In this example, the data source key(s) are labels made up of alpha-numeric strings that allow different types of data (e.g., testing data, testing parameters, testing bodies, and the like) from a single (test) data source (e.g., from the test data source provided and/or accessed by test data source manager 130) to be grouped together so that they can be processed in a single operation (e.g., in a SIMD operation).

At 435, the process determines if a new test or class has been added. If a new test has been added, the process applies the test to the inheriting classes and loops to 430 (e.g., to generate new test results to account for the new test), and if a new class has been added, the process inherits the tests in the base class and loops to 430 (e.g., to generate new test results to account for the new class). If a new test or new class has not been added, the process ends.

Therefore, the processes of FIGS. 3 and 4 generate parallelizable data-driven SIMD tests (e.g., for software development and testing computing environments).

Example Computing Environment

Figure 5:
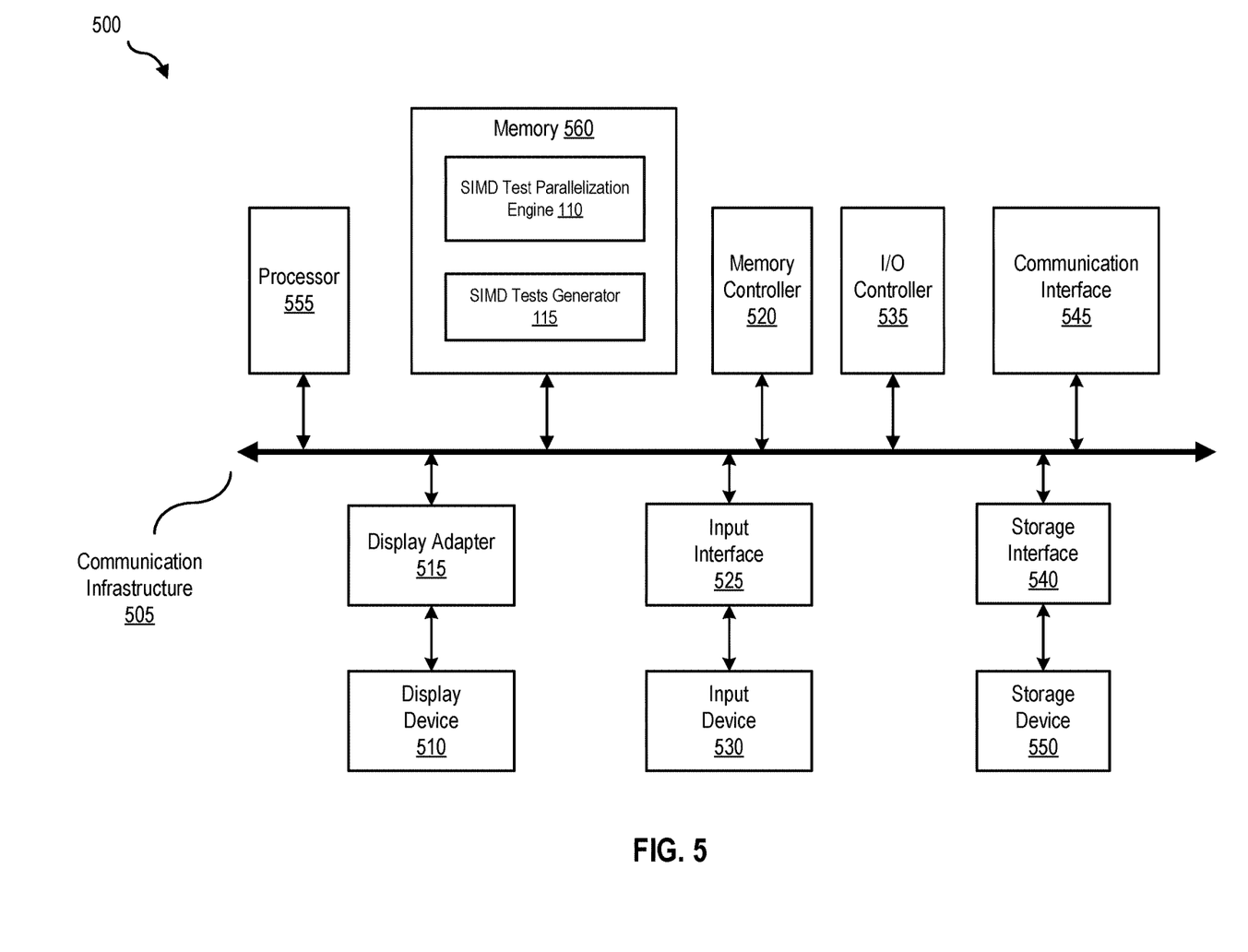
FIG. 5 is a block diagram 500 of a computing system, according to one embodiment of the present disclosure.

FIG. 5 is a block diagram 500 of a computing system, illustrating how SIMD test parallelization engine 110 and/or SIMD tests generator 115 can be implemented in software, according to one embodiment. Computing system 500 can include application testing server 105 and broadly represents any single or multi-processor computing device or system capable of executing computer-readable instructions. Examples of computing system 500 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 500 may include at least one processor 555 and a memory 560. By executing the software that executes SIMD test parallelization engine 110 and/or SIMD tests generator 115, computing system 500 becomes a special purpose computing device that is configured to generate parallelizable data-driven SIMD tests.

Processor 555 generally represents any type or form of processing unit capable of processing data or interpreting and executing instructions. In certain embodiments, processor 555 may receive instructions from a software application or module. These instructions may cause processor 555 to perform the functions of one or more of the embodiments described and/or illustrated herein. For example, processor 555 may perform and/or be a means for performing all or some of the operations described herein. Processor 555 may also perform and/or be a means for performing any other operations, methods, or processes described and/or illustrated herein. Memory 560 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 500 may include both a volatile memory unit and a non-volatile storage device. In one example, program instructions implementing SIMD test parallelization engine 110 and/or SIMD tests generator 115 may be loaded into memory 560.

In certain embodiments, computing system 500 may also include one or more components or elements in addition to processor 555 and/or memory 560. For example, as illustrated in FIG. 5, computing system 500 may include a memory controller 520, an Input/Output (I/O) controller 535, and a communication interface 545, each of which may be interconnected via a communication infrastructure 505. Communication infrastructure 505 generally represents any type or form of infrastructure capable of facilitating communication between one or more components of a computing device. Examples of communication infrastructure 505 include, without limitation, a communication bus (such as an Industry Standard Architecture (ISA), Peripheral Component Interconnect (PCI), PCI express (PCIe), or similar bus) and a network.

Memory controller 520 generally represents any type/form of device capable of handling memory or data or controlling communication between one or more components of computing system 500. In certain embodiments memory controller 520 may control communication between processor 555, memory 560, and I/O controller 535 via communication infrastructure 505. In certain embodiments, memory controller 520 may perform and/or be a means for performing, either alone or in combination with other elements, one or more of the operations or features described and/or illustrated herein.

I/O controller 535 generally represents any type or form of module capable of coordinating and/or controlling the input and output functions of an appliance and/or a computing device. For example, in certain embodiments I/O controller 535 may control or facilitate transfer of data between one or more elements of computing system 500, such as processor 555, memory 560, communication interface 545, display adapter 515, input interface 525, and storage interface 540.

Communication interface 545 broadly represents any type or form of communication device or adapter capable of facilitating communication between computing system 500 and one or more other devices. Communication interface 545 may facilitate communication between computing system 500 and a private or public network including additional computing systems. Examples of communication interface 545 include, without limitation, a wired network interface (such as a network interface card), a wireless network interface (such as a wireless network interface card), a modem, and any other suitable interface. Communication interface 545 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 545 may also represent a host adapter configured to facilitate communication between computing system 500 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 545 may also allow computing system 500 to engage in distributed or remote computing (e.g., by receiving/sending instructions to/from a remote device for execution).

As illustrated in FIG. 5, computing system 500 may also include at least one display device 510 coupled to communication infrastructure 505 via a display adapter 515. Display device 510 generally represents any type or form of device capable of visually displaying information forwarded by display adapter 515. Similarly, display adapter 515 generally represents any type or form of device configured to forward graphics, text, and other data from communication infrastructure 505 (or from a frame buffer, as known in the art) for display on display device 510. Computing system 500 may also include at least one input device 530 coupled to communication infrastructure 505 via an input interface 725. Input device 530 generally represents any type or form of input device capable of providing input, either computer or human generated, to computing system 500. Examples of input device 530 include a keyboard, a pointing device, a speech recognition device, or any other input device.

Computing system 500 may also include storage device 550 coupled to communication infrastructure 505 via a storage interface 540. Storage device 550 generally represents any type or form of storage devices or mediums capable of storing data and/or other computer-readable instructions. For example, storage device 550 may include a magnetic disk drive (e.g., a so-called hard drive), a floppy disk drive, a magnetic tape drive, an optical disk drive, a flash drive, or the like. Storage interface 540 generally represents any type or form of interface or device for transferring and/or transmitting data between storage device 550, and other components of computing system 500. Storage device 550 may be configured to read from and/or write to a removable storage unit configured to store computer software, data, or other computer-readable information. Examples of suitable removable storage units include a floppy disk, a magnetic tape, an optical disk, a flash memory device, or the like. Storage device 550 may also include other similar structures or devices for allowing computer software, data, or other computer-readable instructions to be loaded into computing system 500. For example, storage device 550 may be configured to read and write software, data, or other computer-readable information. Storage device 550 may also be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from that shown in FIG. 5. Computing system 500 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 500 for storage in memory via a network such as the Internet or upon a carrier medium.

The computer-readable medium containing the computer program may be loaded into computing system 500. All or a portion of the computer program stored on the computer-readable medium may then be stored in memory 560 and/or various portions of storage device 550. When executed by processor 555, a computer program loaded into computing system 500 may cause processor 555 to perform and/or be a means for performing the functions of one or more of the embodiments described/illustrated herein. Additionally or alternatively, one or more of the embodiments described and/or illustrated herein may be implemented in firmware and/or hardware. For example, computing system 500 may be configured as an application specific integrated circuit (ASIC) adapted to implement one or more of the embodiments disclosed herein.

Example Networking Environment

Figure 6:
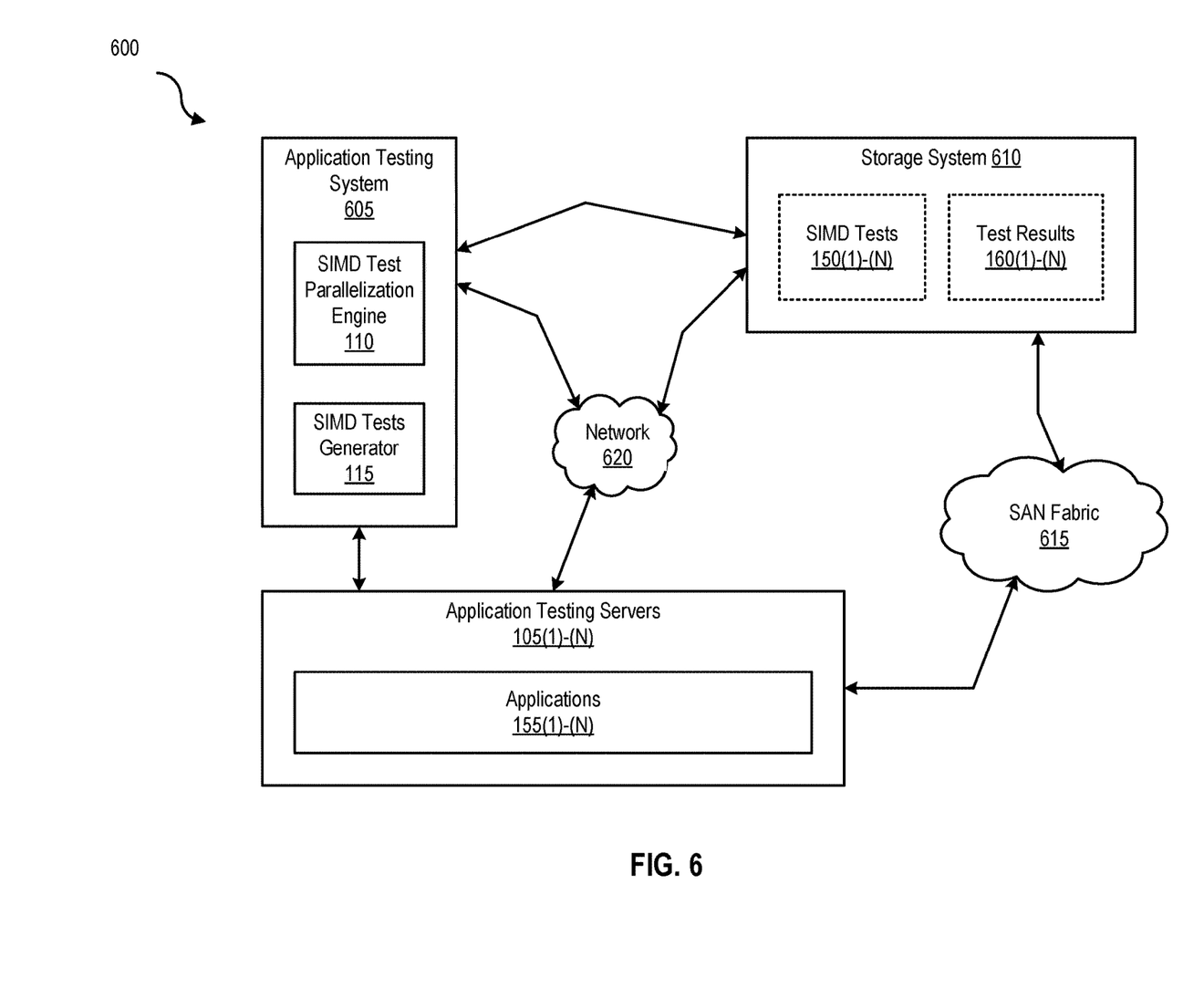
FIG. 6 is a block diagram 600 of a networked system, according to one embodiment of the present disclosure.

FIG. 6 is a block diagram of a networked system, illustrating how various computing devices can communicate via a network, according to one embodiment. In certain embodiments, network-attached storage (NAS) devices may be configured to communicate with application testing server 105 using Network File System (NFS), Server Message Block (SMB), or Common Internet File System (CIFS). Network 620 generally represents any type or form of computer network or architecture capable of facilitating communication for application testing server 105.

In certain embodiments, a communication interface, such as communication interface 545 in FIG. 5, may be used to provide connectivity between application testing server 105 and network 620. The embodiments described and/or illustrated herein are not limited to the Internet or any particular network-based environment.

In some embodiments, network 620 can be a Storage Area Network (SAN). In other embodiments, SIMD test parallelization engine 110 and/or SIMD tests generator 115 may be part of application testing server 105, or may be separate. If separate, SIMD test parallelization engine 110 and/or SIMD tests generator 115, and application testing server 105 may be communicatively coupled via network 620.

In one embodiment, all or a portion of one or more of the disclosed embodiments may be encoded as a computer program and loaded onto and executed by application testing servers 105(1)-(N) and/or application testing system 605, or any combination thereof. All or a portion of one or more of the embodiments disclosed herein may also be encoded as a computer program, stored on application testing servers 105(1)-(N) and/or application testing system 605, and distributed over network 620.

In some examples, all or a portion of application testing servers 105(1)-(N) and/or application testing system 605 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, SIMD test parallelization engine 110 and/or SIMD tests generator 115 may transform the behavior of application testing servers 105(1)-(N) and/or application testing system 605 to generate parallelizable data-driven SIMD tests for application development and testing computing environments.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
designating a base abstract class that defines a plurality of shared testing parameters for a plurality of tests to be performed on an application;
defining a plurality of inheriting classes of the base abstract class;
deriving a data source key from the plurality of inhering classes, wherein the data source key comprises a country code;
accessing a test data source to perform the plurality of tests on the application, wherein the test data source is generated based on the data source key, and wherein the test data source comprises a plurality of data sources including at least:
a credentials data source; and
a validation data source; and
generating a result of the plurality of tests based on the data source key.

2. The computer-implemented method of claim 1, wherein
the plurality of tests comprise a plurality of single instruction multiple data (SIMD) tests.

3. The computer-implemented method of claim 2, further comprising:
creating the plurality of SIMD tests by combining:
an inheritance mechanism for code duplication operations;
at least one of: a unit test methodology, an integration testing methodology, a user interface (UI) testing methodology, or an end-to-end testing methodology for long run time operations; and
the test data source for test data duplication operations.

4. The computer-implemented method of claim 1, further comprising:
executing each inheriting class of the plurality of inheriting classes in parallel.

5. The computer-implemented method of claim 1, further comprising:
determining that a new test has been added to the plurality of tests;
applying the new test to each inheriting class of the plurality of inheriting classes; and
performing the plurality of tests comprising the new test on the application.

6. The computer-implemented method of claim 1, further comprising:
adding a new inheriting class to the plurality of inheriting classes to permit the new inheriting class to inherit the plurality of tests in the base abstract class; and
performing the plurality of tests comprising the new inheriting class on the application.

7. A non-transitory computer readable storage medium comprising program instructions executable to:
designate a base abstract class that defines a plurality of shared testing parameters for a plurality of tests to be performed on an application;
define a plurality of inheriting classes of the base abstract class;
derive a data source key from the plurality of inhering classes, wherein the data source key comprises a country code;
access a test data source to perform the plurality of tests on the application, wherein the test data source is generated based on the data source key, and wherein the test data source comprises a plurality of data sources including at least:
a credentials data source; and
a validation data source; and
generate a result of the plurality of tests based on the data source key.

8. The non-transitory computer readable storage medium of claim 7, wherein
the plurality of tests comprise a plurality of single instruction multiple data (SIMD) tests.

9. The non-transitory computer readable storage medium of claim 8, further comprising:
creating the plurality of SIMD tests by combining:
an inheritance mechanism for code duplication operations;
at least one of: a unit test methodology, an integration testing methodology, a user interface (UI) testing methodology, or an end-to-end testing methodology for long run time operations; and
the test data source for test data duplication operations.

10. The non-transitory computer readable storage medium of claim 7, further comprising:
executing each inheriting class of the plurality of inheriting classes in parallel.

11. The non-transitory computer readable storage medium of claim 7, further comprising:
determining that a new test has been added to the plurality of tests;
applying the new test to each inheriting class of the plurality of inheriting classes; and
performing the plurality of tests comprising the new test on the application.

12. The non-transitory computer readable storage medium of claim 7, further comprising:
adding a new inheriting class to the plurality of inheriting classes to permit the new inheriting class to inherit the plurality of tests in the base abstract class; and
performing the plurality of tests comprising the new inheriting class on the application.

13. A system comprising: one or more processors; and
a memory coupled to the one or more processors, wherein the memory stores program instructions executable by the one or more processors to:
designate a base abstract class that defines a plurality of shared testing parameters for a plurality of tests to be performed on an application;
define a plurality of inheriting classes of the base abstract class;
derive a data source key from the plurality of inhering classes, wherein the data source key comprises a country code;
access a test data source to perform the plurality of tests on the application, wherein the test data source is generated based on the data source key, and wherein the test data source comprises a plurality of data sources including at least:
a credentials data source; and
a validation data source; and
generate a result of the plurality of tests based on the data source key.

14. The system of claim 13, wherein
the plurality of tests comprise a plurality of single instruction multiple data (SIMD) tests.

15. The system of claim 14, further comprising:
creating the plurality of SIMD tests by combining:
an inheritance mechanism for code duplication operations;
at least one of: a unit test methodology, an integration testing methodology, a user interface (UI) testing methodology, or an end-to-end testing methodology for long run time operations; and
the test data source for test data duplication operations.

16. The system of claim 13, further comprising:
executing each inheriting class of the plurality of inheriting classes in parallel.

17. The system of claim 13, further comprising:
determining that a new test has been added to the plurality of tests;
applying the new test to each inheriting class of the plurality of inheriting classes;
adding a new inheriting class to the plurality of inheriting classes, wherein
the adding permits the new inheriting class to inherit the plurality of tests in the base abstract class; and
performing the plurality of tests comprising the new test and the new inheriting class on the application.

18. The system of claim 13, further comprising:
adding a new inheriting class to the plurality of inheriting classes to permit the new inheriting class to inherit the plurality of tests in the base abstract class; and
performing the plurality of tests comprising the new inheriting class on the application.

19. The system of claim 14, further comprising:
creating the plurality of SIMD tests by combining:
a base abstract class manager;
an inheriting class manager; and
a test data source manager.

20. The computer-implemented method of claim 2, further comprising:
creating the plurality of SIMD tests by combining:
an inheritance principle from object-oriented programming;
unit testing run parallelization; and
a data-driven testing approach.

* * * * *